United States Patent
Srivastav et al.

(10) Patent No.: US 10,297,159 B2
(45) Date of Patent: May 21, 2019

(54) SYSTEMS AND METHODS FOR GRAPHICAL VISUALIZATION OF COMMUNICATION TRANSMISSIONS RECEIVED ONBOARD AN AIRCRAFT

(71) Applicant: HONEYWELL INTERNATIONAL INC., Morris Plains, NJ (US)

(72) Inventors: Amit Srivastav, Karnataka (IN); Jinming Huang, Beijing (CN); Krishna Idupunur, Andhra Pradesh (IN); Murali Kusuma, Andhra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 130 days.

(21) Appl. No.: 15/461,877

(22) Filed: Mar. 17, 2017

(65) Prior Publication Data
US 2018/0268718 A1    Sep. 20, 2018

(51) Int. Cl.
*G08G 5/00* (2006.01)
*H04B 7/185* (2006.01)
(Continued)

(52) U.S. Cl.
CPC ........... *G08G 5/0021* (2013.01); *G06T 17/05* (2013.01); *G06T 19/006* (2013.01);
(Continued)

(58) Field of Classification Search
CPC .... G08G 5/0021; G08G 5/025; G08G 5/0065; G08G 5/0013; G08G 5/065;
(Continued)

(56) References Cited

U.S. PATENT DOCUMENTS 5,111,400 A     5/1992  Yoder
7,177,731 B2 *  2/2007  Sandell .............. G08G 5/0013
                                            701/3
(Continued)

FOREIGN PATENT DOCUMENTS

EP    2717018 A2    9/2013
EP    2955707 A2    12/2015
(Continued)

OTHER PUBLICATIONS

Extended EP Search Report for Application No. 18161633.5 dated Sep. 9, 2018.

*Primary Examiner* — Peter D Nolan
(74) *Attorney, Agent, or Firm* — Lorenz & Kopf, LLP

(57) ABSTRACT

A method for providing air traffic control (ATC) message data onboard an aircraft is provided. The method identifies ATC commands associated with text-based messages, by at least one processor onboard the aircraft, wherein the ATC commands comprise instructions to follow one or more particular procedures associated with the ATC audio messages and the ATC direct text messages; identifies, by the at least one processor, graphical content associated with the ATC commands; and presents an ATC graphical rendering environment comprising at least the graphical content, via at least one aircraft onboard display communicatively coupled to the at least one processor.

14 Claims, 6 Drawing Sheets

(51) Int. Cl.
*G06T 19/00* (2011.01)
*G06T 17/05* (2011.01)
*G10L 15/26* (2006.01)
*G08G 5/02* (2006.01)
*G08G 5/06* (2006.01)
*B64D 45/00* (2006.01)

(52) U.S. Cl.
CPC ......... *G08G 5/0013* (2013.01); *G08G 5/0065* (2013.01); *G08G 5/025* (2013.01); *G08G 5/065* (2013.01); *G10L 15/265* (2013.01); *H04B 7/18506* (2013.01); *B64D 2045/0075* (2013.01)

(58) Field of Classification Search
CPC ..... G10L 15/265; G06T 17/05; G06T 19/006; H04B 7/18506; B64D 2045/0075
See application file for complete search history.

(56) References Cited

U.S. PATENT DOCUMENTS

| | | | | |
|---|---|---|---|---|
| 7,733,903 | B2 * | 6/2010 | Bhogal | G08G 5/0013 340/961 |
| 7,737,867 | B2 | 6/2010 | Arthur et al. | |
| 8,164,487 | B1 * | 4/2012 | Tsai | G01C 23/00 340/574 |
| 8,335,988 | B2 * | 12/2012 | Fahy | G06F 17/243 715/706 |
| 8,704,701 | B2 * | 4/2014 | Pschierer | G08G 5/0013 342/182 |
| 9,013,330 | B2 * | 4/2015 | Nutaro | G08G 5/065 340/945 |
| 9,262,927 | B2 * | 2/2016 | Populus | G08G 5/0013 |
| 9,293,050 | B2 | 3/2016 | Judy | |
| 9,384,586 | B1 | 7/2016 | McCusker et al. | |
| 9,443,433 | B1 | 9/2016 | Conway et al. | |
| 9,592,921 | B2 * | 3/2017 | Paul Dominic | B64D 45/00 |
| 9,772,712 | B2 * | 9/2017 | Kneuper | G08G 5/0052 |
| 2002/0143553 | A1 * | 10/2002 | Migdol | G10L 15/26 704/275 |
| 2006/0046715 | A1 * | 3/2006 | Burgemeister | G08G 5/0013 455/431 |
| 2007/0189328 | A1 * | 8/2007 | Judd | G10L 15/26 370/466 |
| 2008/0045198 | A1 * | 2/2008 | Bhogal | G08G 5/0013 455/414.4 |
| 2008/0114504 | A1 * | 5/2008 | Goodman | G08G 5/0013 701/3 |
| 2008/0195309 | A1 * | 8/2008 | Prinzel, III | G01C 23/00 701/532 |
| 2009/0089693 | A1 * | 4/2009 | Fahy | G06F 17/243 715/764 |
| 2013/0027226 | A1 * | 1/2013 | Cabos | G08G 5/0013 340/961 |
| 2013/0057414 | A1 * | 3/2013 | Nutaro | G08G 5/0021 340/958 |
| 2013/0346081 | A1 * | 12/2013 | Loubiere | G08G 5/0013 704/260 |
| 2014/0253585 | A1 * | 9/2014 | Paul Dominic | B64D 45/00 345/629 |
| 2015/0081292 | A1 * | 3/2015 | Populus | G08G 5/0013 704/235 |
| 2015/0162001 | A1 * | 6/2015 | Kar | G08G 5/0013 704/235 |
| 2016/0229554 | A1 | 8/2016 | Kawalkar et al. | |
| 2017/0365177 | A1 * | 12/2017 | Puentes | B64D 43/00 |

FOREIGN PATENT DOCUMENTS

| | | |
|---|---|---|
| WO | 2007098329 A1 | 8/2007 |
| WO | 2014115139 A1 | 7/2014 |

* cited by examiner

SYSTEMS AND METHODS FOR GRAPHICAL VISUALIZATION OF COMMUNICATION TRANSMISSIONS RECEIVED ONBOARD AN AIRCRAFT

TECHNICAL FIELD

Embodiments of the subject matter described herein relate generally to providing clarification for received communications onboard an aircraft. More particularly, embodiments of the subject matter relate to presenting a graphical display associated with the received communications.

BACKGROUND

Communication error may be one contributing factor to runway issues and other surface movement related incidents onboard an aircraft. Radio telephony phraseology has been developed for voice communication between Air Traffic Control (ATC) and flight crew members, and digital message communication phraseology has been developed for text-based communication (e.g., Controller-Pilot Data Link Communications (CPDLC)). Such standards provide clarification in an effort to prevent confusion. However in cases of low visibility conditions, a pilot maneuvering in a new airport, a pilot misinterpreting ATC commands, or a complex aerodrome layout, voice or textual ATC messages may not provide complete guidance, based on environmental conditions, for a flight crew to maneuver inside an aerodrome and aerodrome terminal area.

Accordingly, it is desirable to provide additional communication clarification data onboard the aircraft. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing air traffic control (ATC) message data onboard an aircraft. The method identifies ATC commands associated with text-based messages, by at least one processor onboard the aircraft, wherein the ATC commands comprise instructions to follow one or more particular procedures associated with the ATC audio messages and the ATC direct text messages; identifies, by the at least one processor, graphical content associated with the ATC commands; and presents an ATC graphical rendering environment comprising at least the graphical content, via at least one aircraft onboard display communicatively coupled to the at least one processor.

Some embodiments of the present disclosure provide a system for providing air traffic control (ATC) message data onboard an aircraft. The system includes: system memory; at least one communication device, configured to receive ATC audio messages and ATC direct text messages; at least one aircraft onboard display configured to present graphical content associated with the ATC audio messages and the ATC direct text messages; and at least one processor communicatively coupled to the system memory, the at least one communication device, and the at least one aircraft onboard display, the at least one processor configured to: identify ATC commands associated with text-based messages, wherein the ATC commands comprise instructions to follow one or more particular procedures associated with the ATC audio messages and the ATC direct text messages; identify graphical content associated with the ATC commands; and initiate presentation of an ATC graphical rendering environment comprising at least the graphical content, via the at least one aircraft onboard display.

Some embodiments of the present disclosure provide a non-transitory, computer-readable medium containing instructions thereon, which, when executed by a processor, perform a method. The method identifies, by the processor, graphical content associated with a set of text messages associated with air traffic control (ATC) commands received onboard an aircraft, wherein the ATC commands comprise instructions to follow one or more particular procedures associated with the ATC audio messages and the ATC direct text messages; and presents an ATC graphical rendering environment including the graphical content, via a display device communicatively coupled to the processor, wherein the ATC graphical rendering environment comprises at least one of an augmented reality display, a virtual reality display, an aircraft map display, an en route terrain display, and an obstacle display.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for real-time graphical realization of air traffic control (ATC) messages. More specifically, the subject matter relates to the identification of graphical elements associated with received ATC messages, and the presentation of the related graphical elements via a display device onboard the aircraft as part of a "virtual scene" that presents additional context and details associated with received ATC instructions. Existing cockpit displays do not provide graphical visualization of received ATC communications. This graphical presentation facilitates communication between ATC and flight crew members onboard the aircraft by clarifying transmitted ATC commands using a visual interpretation. The graphical presentation is used during all phases of flight, including support ATC command during any flight phase, including an en route phase and a terminal phase.

Certain terminologies are used with regard to the various embodiments of the present disclosure. An ATC graphical rendering environment is a virtual reality and/or augmented reality scene presented to assist a flight crew in performing flight operations. The ATC graphical rendering environment generally includes graphical elements representing one or more of a runway, a taxiway, an apron, one or more obstacles, one or more buildings, and any surrounding features of the environment. Air traffic control (ATC) commands are instructions provided to the flight crew of an aircraft, to perform particular flight operations or steps or processes associated with particular flight operations. Graphical elements associated with ATC commands are based on ATC phraseology, and may include aerodrome surface movement phraseology, phraseology associated with a standard instrument departure (SID) route, phraseology associated with a standard arrival (STAR) route, approach procedures phraseology, phraseology associated with aircraft en route procedures, or the like.

Figure 1:
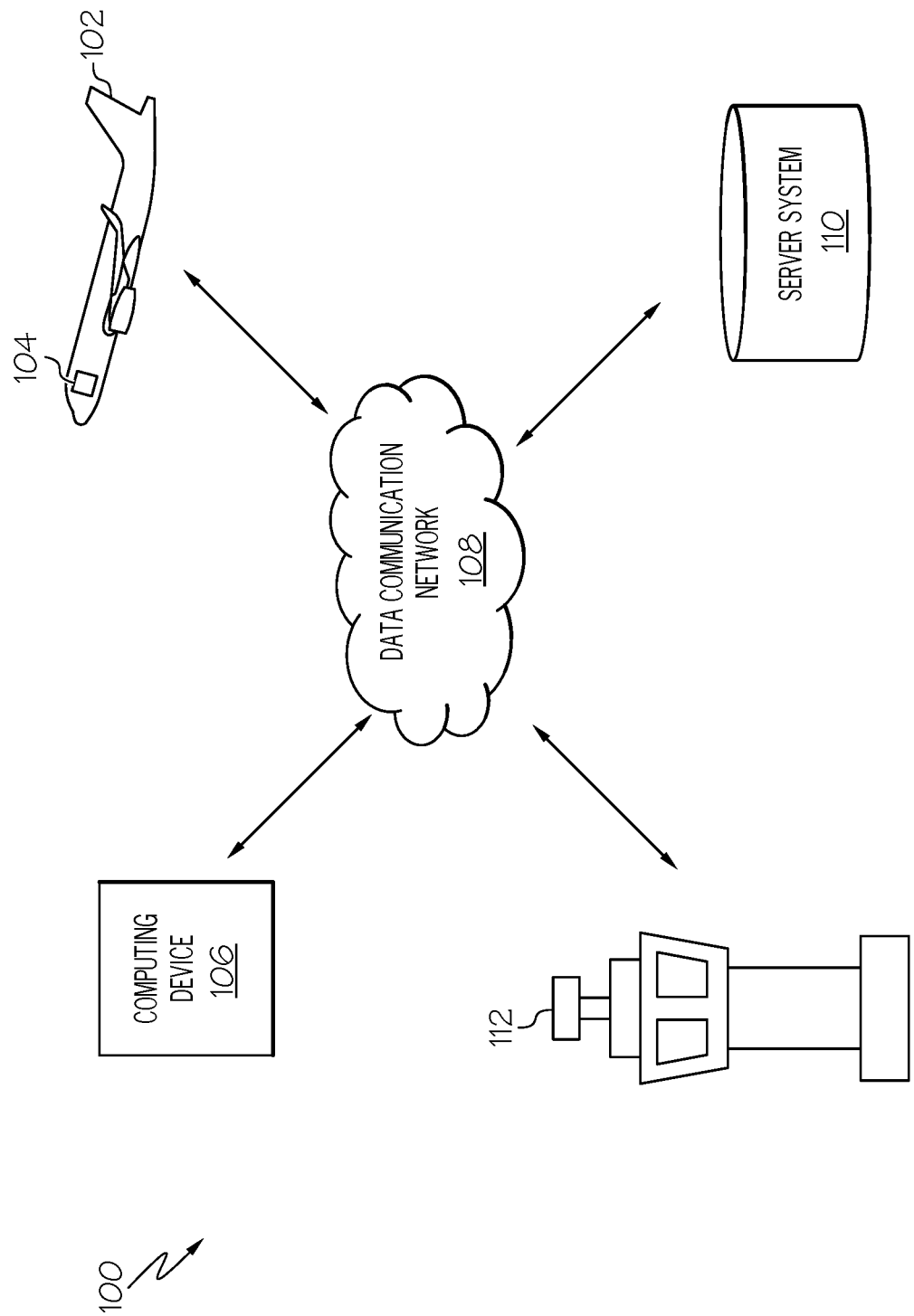
FIG. 1 is a diagram of an air traffic control (ATC) message visualization system, in accordance with the disclosed embodiments.

Turning now to the figures, FIG. 1 is a diagram of an air traffic control (ATC) message visualization system 100, in accordance with the disclosed embodiments. The ATC message visualization system 100 operates to identify appropriate graphical elements associated with received ATC communications, and to present the identified graphical elements as part of an ATC graphical rendering environment display onboard an aircraft 102 during flight. The ATC message visualization system 100 provides real-time, graphical visualization of ATC messages under various operational scenarios, including, without limitation: during aerodrome surface movement, during a standard instrument departure (SID) route, during a standard arrival (STAR) route, during approach procedures, and during flight (e.g., en route) to a destination.

The ATC message visualization system 100 may include, without limitation, a computing device 106 that functions onboard an aircraft 102 to communicate with air traffic control 112 or other ground station and at least one server system 110, via a data communication network 108. In practice, certain embodiments of the ATC message visualization system 100 may include additional or alternative elements and components, as desired for the particular application.

The computing device 106 may be implemented by any computing device that includes at least one processor, some form of memory hardware, a user interface, and communication hardware. For example, the computing device 106 may be implemented using a personal computing device, such as a tablet computer, a laptop computer, a personal digital assistant (PDA), a smartphone, or the like. In this scenario, the computing device 106 is capable of storing, maintaining, and executing an Electronic Flight Bag (EFB) application configured to determine and present an ATC graphical rendering environment that includes graphical elements associated with received ATC communications. In other embodiments, the computing device 106 may be implemented using a computer system onboard the aircraft 102, which is configured to determine and present the ATC graphical rendering environment.

The aircraft 102 may be any aviation vehicle for which ATC communications are received and applicable during completion of a flight plan. The aircraft 102 may be implemented as an airplane, helicopter, spacecraft, hovercraft, or the like. The external camera system 104 may include one or more cameras positioned and configured to capture images outside of the aircraft 102, and to provide the images to the computing device 106 for display and use as part of an ATC graphical rendering environment.

The server system 110 may include any number of application servers, and each server may be implemented using any suitable computer. In some embodiments, the server system 110 includes one or more dedicated computers. In some embodiments, the server system 110 includes one or more computers carrying out other functionality in addition to server operations. The server system 110 may store and provide any type of data used to identify and present an ATC graphical rendering environment associated with ATC communications received onboard the aircraft 102. Such data may include, without limitation: ATC command data, graphical element identification data, ATC graphical rendering environment data, and other data compatible with the computing device 106.

The computing device 106 is usually located onboard the aircraft 102, and the computing device 106 communicates with the server system 110 and air traffic control 112 via a wireless communication connection. The computing device 106 and the server system 110 are generally disparately located, and the computing device 106 and air traffic control 112 are generally disparately located. The computing device 106 communicates with the server system 110 and air traffic control 112 via the data communication network 108 and/or via communication mechanisms onboard the aircraft 102.

The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein. Exemplary embodiments of the data communication network 108 may be implemented using a satellite communication (SATCOM) network, a very high frequency (VHF) or high frequency (HF) radio communication network, a 4G Long Term Evolution (4G LTE) cellular communication network, an Airport Mobile Access Communication System (AeroMACS) communication network, or the like.

During typical operation, the computing device 106 receives communication transmissions from air traffic control 112, via the data communication network 108, which include instructions for the flight crew members of the aircraft 102 to follow specific procedures during operation of the aircraft 102. Received communication transmissions may include radio communications (i.e., audio messages) and text-based messages. The computing device 106 functions to transcribe the audio messages into text messages, automatically identifies ATC commands associated with the text messages, determines an appropriate visual representation of the identified ATC commands, and presents the visual representation onboard the aircraft 102 using one or more of: a cockpit integrated display, a display of the computing device 106, a near-to-eye (NTE) display, a head-up display (HUD), or the like.

Figure 2:
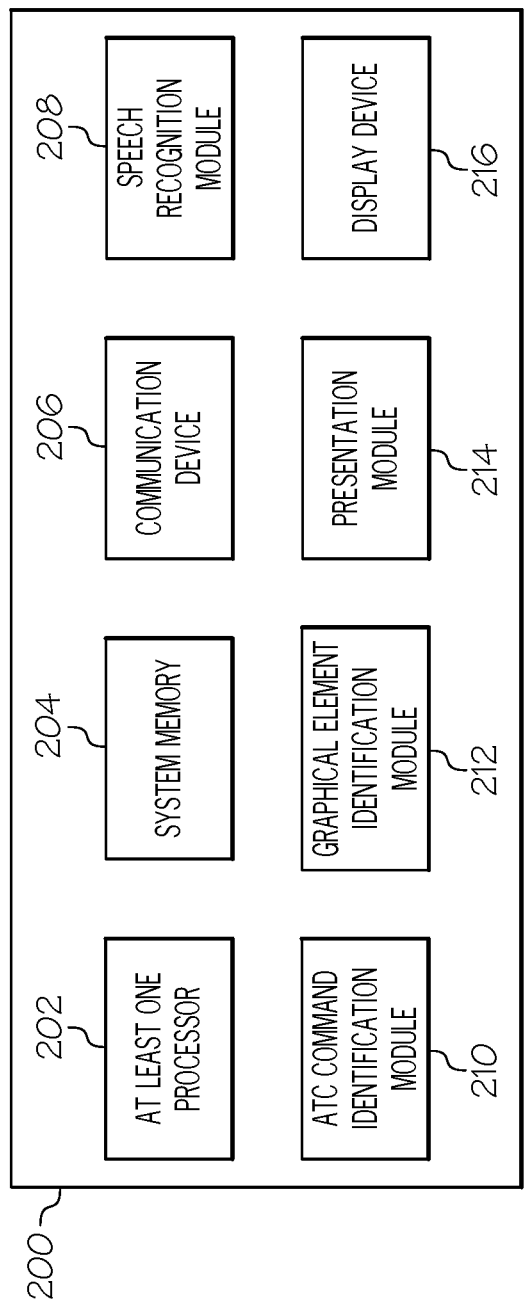
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 106 depicted in FIG. 1. In this regard, the computing device 200 shows certain elements and components of the computing device 106 in more detail.

The computing device 200 generally includes, without limitation: at least one processor 202; system memory 204; a communication device 206; a speech recognition module 208; an air traffic control (ATC) command identification module 210; a graphical element identification module 212; a presentation module 214; and a display device 216. These elements and features of the computing device 200 may be operatively associated with one another, coupled to one another, or otherwise configured to cooperate with one another as needed to support the desired functionality—in particular, dynamically presenting graphical elements associated with ATC commands received onboard an aircraft during flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with presenting graphical elements associated with received ATC commands. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to communicate data between the computing device 200 and one or more remote servers, and between the computing device 200 and an air traffic control center. The communication device 206 may transmit and receive communications over a wireless local area network (WLAN), the Internet, a satellite uplink/downlink, a cellular network, a broadband network, a wide area network, or the like. Exemplary embodiments of the communication device 206 may be implemented using a satellite communication (SATCOM) device, a very high frequency (VHF) or high frequency (HF) radio communication device, a 4G Long Term Evolution (4G LTE) cellular communication device, an Airport Mobile Access Communication System (AeroMACS) communication device, a Controller-Pilot Data Link Communications (CPDLC) device, or the like.

In some embodiments, the communication device 206 may be implemented using a single apparatus configured to transmit and receive communication transmissions according to a single communication protocol. In some embodiments, the communication device 206 may be implemented using more than one apparatus, wherein each apparatus is configured to transmit and receive communication transmissions according to a defined communication protocol, as described herein. For example, the communication device 206 may include a VHF radio configured to receive audio messages, a CPDLC configured to receive direct text messages, and a cellular communication device configured to transmit requests to, and receive data from, a remote server. In some embodiments, the communication device 206 may be an integrated device configured to transmit and receive communication transmissions according to more than one defined communication protocol.

As described in more detail below, data received by the communication device 206 may include, without limitation: air traffic control (ATC) communication transmissions (e.g., ATC audio transmissions, ATC direct text transmissions), ATC command data, graphical element identification data, ATC graphical rendering environment data, and other data compatible with the computing device 200. Data provided by the communication device 206 may include, without limitation, requests for graphical element identification data, requests for ATC command data, requests for graphical element identification data, and the like.

The speech recognition module 208 is suitably configured to recognize words and phrases from received radio transmissions (i.e., audio communication data). Radio transmissions are generally transmitted by air traffic control (ATC), and are received by the communication device 206 of the computing device 200, which is being used onboard an aircraft (e.g., aircraft 102 of FIG. 1). The speech recognition module 208 uses conventional speech recognition techniques, which need not be described in detail here, to transcribe the received audio communication data into text-based messages for further use.

The air traffic control (ATC) command identification module 210 is configured to identify ATC commands associated with the text-based words and phrases determined by the speech recognition module 208. ATC commands are delivered by Air Traffic Control (ATC) to flight crew members onboard an aircraft, and are based on standard ATC phraseology, as described previously. Examples of ATC commands may include, without limitation: taxi clearance commands, take-off clearance commands, push-back clearance commands, approach clearance commands, landing clearance commands, arrival clearance commands, or the like.

The graphical element identification module 212 is configured to determine particular graphical elements associated with ATC commands, identified by ATC command identification module 210, associated with the text-based messages. Graphical elements associated with ATC commands may include, without limitation, aerodrome surface movement commands, commands associated with a standard instrument departure (SID) route, commands associated with a standard arrival (STAR) route, approach procedures commands, aircraft en route procedures or the like. Graphical elements are used as part of an ATC graphical rendering environment, such as a virtual reality or augmented reality display, thus providing a visual representation of an instruction from ATC to the flight crew of the aircraft.

The presentation module 214 operates cooperatively with the display device 216 to present a graphical display, the graphical display comprising graphical elements associated with ATC commands received at the aircraft (and identified by the graphical element identification module 212. In certain embodiments, the presentation module 214 may present graphical elements as part of an augmented reality display or virtual reality display. The presentation module 214 generates a "virtual scene" and graphical simulation for viewing by the flight crew members, based on airport geographic mapping data, ATC phraseology (e.g., per standard air traffic control message formats), and aircraft parameters. The presentation module 214 may generate the ATC graphical rendering environment based on information obtained from an airport map database, an en route terrain database, and/or an obstacle database, via the communication device 206.

In some embodiments, the presentation module 214 may present graphical elements over an Airport Moving Map (AMM) or other ATC graphical rendering environment. An Airport Moving Map (AMM) application is generally an Electronic Flight Bag (EFB) application stored, maintained, and executed by a computing device 200. The AMM application uses a detailed database to dynamically render maps of an airport's runways, taxiways, and airport structures. Through the use of global positioning system (GPS) technology, the application shows the position of the aircraft ("ownship") on the airport surface.

Figure 6:
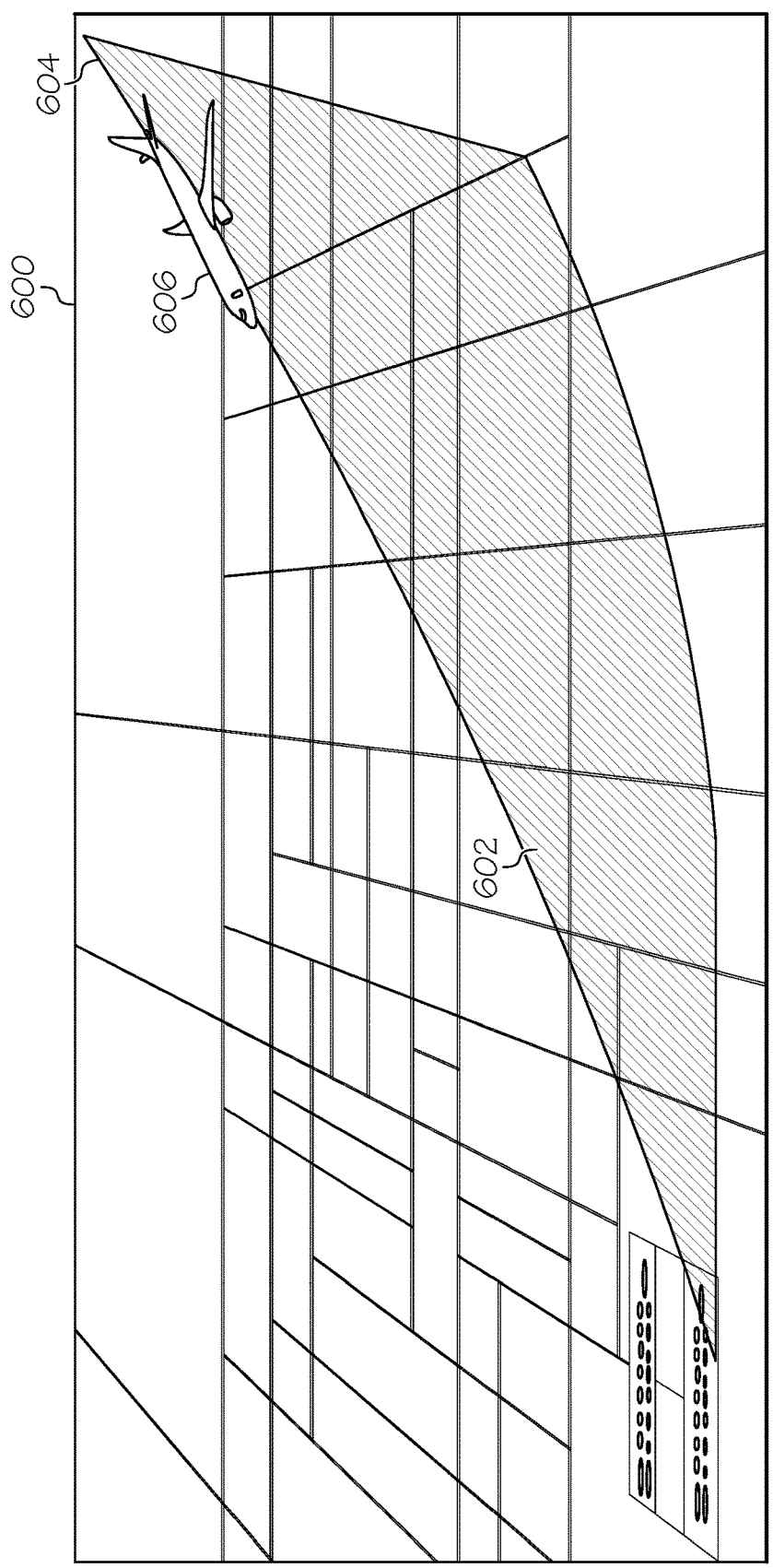
FIG. 6 is a diagram of an exemplary embodiment of an ATC graphical rendering environment, in accordance with the disclosed embodiments.
Figure 7:
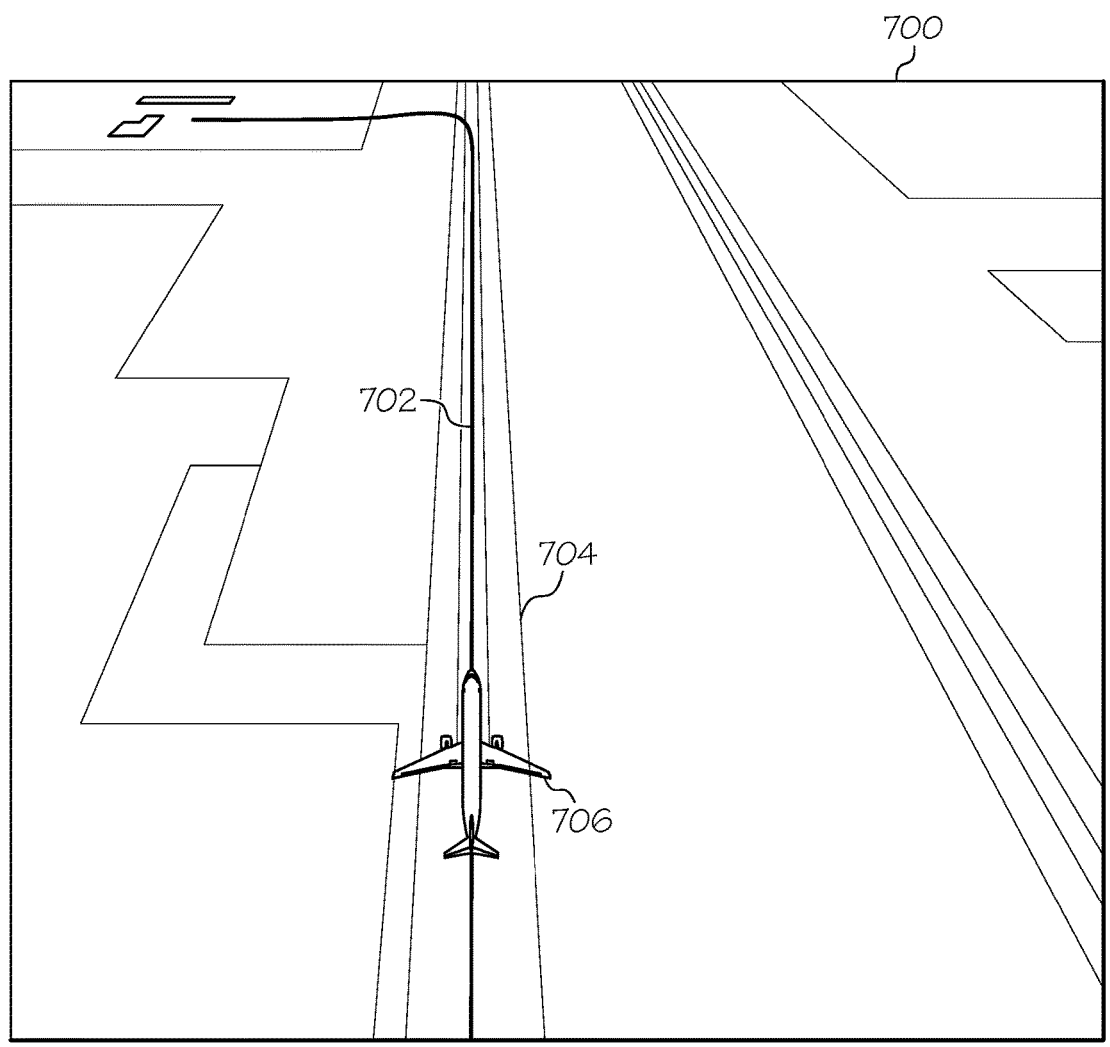
FIG. 7 is a diagram of another exemplary embodiment of an ATC graphical rendering environment, in accordance with the disclosed embodiments.

Examples of graphical elements identified by the graphical element identification module 212 and presented by the presentation module 214 (via the display device 216) are shown in FIGS. 6-7. FIG. 6 is a diagram of an exemplary embodiment of an ATC graphical rendering environment 600, in accordance with the disclosed embodiments. As shown, the ATC graphical rendering environment 600 (i.e., a graphical representation of a geographic location of the aircraft 606) includes a three-dimensional (3-D) model 602 of an air traffic control (ATC) command related to an instrument landing system (ILS) approach procedure 604 for the aircraft 606. The embodiment of the ATC graphical rendering environment 600 is shown by an aircraft 606 that has received an ATC command associated with the ILS approach procedure 604 shown. Text-based ATC messages generally include instructions, commands, or approval to perform particular procedures onboard the aircraft 606. An ATC text-based message for approach clearance, for the aircraft 606, may include phrasing indicating that the aircraft 606 has been cleared to fly a specific procedure and the word "approach". For example, "CLEARED I-L-S RUNWAY TWO FIVE LEFT APPROACH". As shown, the ATC graphical rendering environment 600 presents a graphical element associated with the received ATC command, such as a 3-D model 602 of an ILS approach procedure 604, which represents a series of altitude values for use by the aircraft 606 during approach, which are presented graphically on a map. In this example, the 3-D model 602 is associated with the received ATC command and represents the series of altitude values.

FIG. 7 is a diagram of another exemplary embodiment of ATC graphical rendering environment 700, in accordance with the disclosed embodiments. As shown, the ATC graphical rendering environment 700 includes a three-dimensional (3-D) model of an air traffic control (ATC) command related to a taxi route 702 for an aircraft 706. The embodiment of the ATC graphical rendering environment 700 is displayed onboard an aircraft 706 that has received an ATC command associated with the taxi route 702 associated with a runway 704 shown. Text-based ATC messages generally include instructions, commands, or approval to perform particular procedures onboard the aircraft 706. An ATC text-based message for taxi clearance may include phrasing indicating that the particular aircraft 706 has been cleared to taxi, using the taxi route 702 for a particular runway 704. For example, "CLEARED HOTEL THREE TAXI". As shown, the ATC graphical rendering environment 700 presents a taxi route 702 of a runway 704, which is a graphical representation of the ATC command received onboard the aircraft 706 and which provides a visual reinforcement and clarification of the received ATC command for the flight crew of the aircraft 706.

Returning to FIG. 2, in practice, the speech recognition module 208, the ATC command identification module 210, the graphical element identification module 212, and/or the presentation module 214 may be implemented with (or cooperate with) the at least one processor 202 to perform at least some of the functions and operations described in more detail herein. In this regard, the speech recognition module 208, the ATC command identification module 210, the graphical element identification module 212, and/or the presentation module 214 may be realized as suitably written processing logic, application program code, or the like.

The display device 216 is configured to display various icons, text, and/or graphical elements associated with ATC communication transmissions and ATC commands, including, taxi clearance commands, take-off clearance commands, landing clearance commands, departure clearance commands, arrival clearance commands, approach clearance commands, aircraft en route procedures commands, or the like. In an exemplary embodiment, the display device 216 is communicatively coupled to the at least one processor 202. The at least one processor 202 and the display device 216 are cooperatively configured to display, render, or otherwise convey one or more graphical representations or images associated with ATC communication transmissions and ATC commands on the display device 216, as described in greater detail below.

Embodiments of the display device 216 may be realized as an electronic display configured to graphically display ATC communication transmission data and ATC command data, as described herein. Exemplary embodiments of the display device 216 may be implemented using one or more of: a cockpit integrated display, a display of the computing device 106, a near-to-eye (NTE) display, a head-up display (HUD), or the like. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
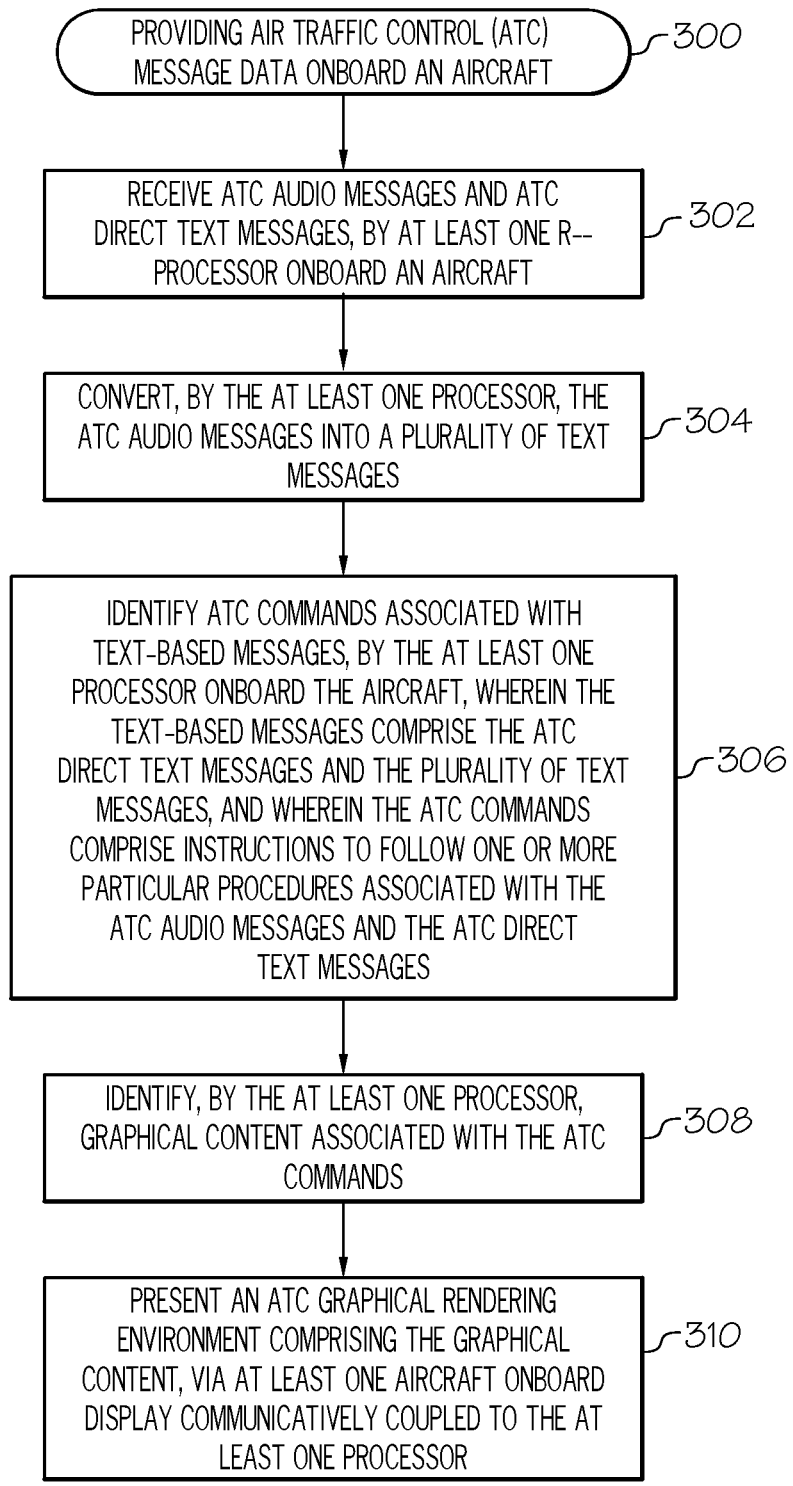
FIG. 3 is a flow chart that illustrates an embodiment of a process for providing air traffic control (ATC) message data onboard an aircraft.

FIG. 3 is a flow chart that illustrates an embodiment of a process 300 for providing air traffic control (ATC) message data onboard an aircraft. First, the process 300 receives ATC audio messages and ATC direct text messages, by at least one processor onboard the aircraft (step 302). An aircraft generally receives audio and text message transmissions from air traffic control (ATC), as described previously with regard to FIGS. 1-2.

The process 300 converts, by the at least one processor, the ATC audio messages into a plurality of text messages (step 304), using conventional speech recognition techniques and technology. Text-based messages are used by the process 300 to create a relevant "virtual scene" (e.g., an ATC graphical rendering environment) using virtual reality and/ or augmented reality. Here, the process 300 translates received audio messages into text, such that received text messages and received audio messages may be used to create the ATC graphical rendering environment.

The process 300 then identifies ATC commands associated with text-based messages, by the at least one processor onboard the aircraft, wherein the text-based messages comprise the ATC direct text messages and the plurality of text messages, and wherein the ATC commands comprise instructions to follow one or more particular procedures associated with the ATC audio messages and the ATC direct text messages (step 306). One suitable methodology for identifying the ATC commands associated with text-based messages is described below with reference to FIG. 4. An ATC command is an instruction provided to the flight crew of an aircraft, to perform particular flight operations or steps or processes associated with particular flight operations.

Here, the process 300 has received text messages from ATC and has translated received audio messages into text messages. The process 300 uses the text of the messages to identify the content of the messages, wherein the content comprises one or more ATC commands (i.e., ATC instructions).

Next, the process 300 identifies, by the at least one processor, graphical content associated with the ATC commands (step 308). One suitable methodology for identifying the graphical content associated with the ATC commands is described below with reference to FIG. 5. Graphical content provides a visual representation of received ATC commands, for purposes of presenting visual cues, enhanced context, and additional detail associated with the received ATC commands. The graphical content may include any graphical element configured for presentation via display device onboard the aircraft. Exemplary embodiments of graphical content associated with ATC commands is described with regard to FIGS. 6-7.

The process 300 then presents an ATC graphical rendering environment comprising the graphical content, via at least one aircraft onboard display communicatively coupled to the at least one processor (step 310). The ATC graphical rendering environment is generally implemented as a virtual reality display, an augmented reality display, and/or an airport map display. The ATC graphical rendering environment may be generated using data from an airport map database, an en route terrain database, and/or an obstacle database. In some embodiments, the process 300 presents the ATC graphical rendering environment using a "top view" (i.e., a birds-eye view from directly above the presented virtual scene) and/or a three-dimensional (3-D) view. The process 300 presents graphical elements associated with received ATC commands in the "virtual scene", thus providing a visual representation of the ATC instructions via head-up display (HUD), near-to-eye (NTE) display, a computing device display for presentation of electronic flight bag (EFB) content, integrated cockpit display, or the like.

In some embodiments, including low-visibility conditions, the process 300 obtains a video feed for presentation inside the aircraft to provide additional outside visibility, via a camera mounted on an external surface of the aircraft. The process 300 then presents the video feed, as part of the ATC graphical rendering environment, via the at least one aircraft onboard display. In this example, the video feed is presented as part of the virtual reality or augmented reality environment and provides additional visual details to the flight crew.

Figure 4:
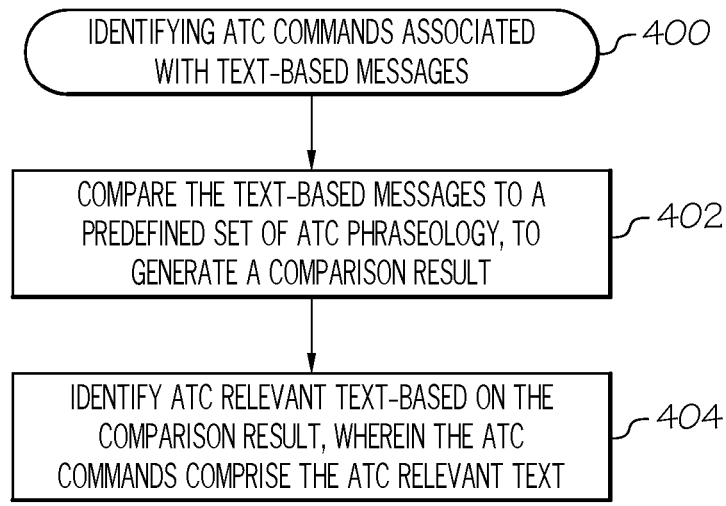
FIG. 4 is a flow chart that illustrates an embodiment of a process for identifying ATC commands associated with text-based messages.

FIG. 4 is a flow chart that illustrates an embodiment of a process 400 for identifying ATC commands associated with text-based messages. It should be appreciated that the process 400 described in FIG. 4 represents one embodiment of step 306 described above in the discussion of FIG. 3, including additional detail.

The process 400 compares the text-based messages to a predefined set of ATC phraseology, to generate a comparison result (step 402). Text-based ATC messages generally include instructions, commands, or approval to perform particular procedures onboard the aircraft. In one case, in a text-based message for arrival clearance, an ATC message may include a standard arrival (STAR) name and number and the word "arrival". For example, "ROSEWOOD ONE ARRIVAL". In a second case, an ATC text-based message for approach clearance may include phrasing indicating that the aircraft has been cleared to fly a specific procedure and the word "approach". For example, "CLEARED I-L-S RUNWAY TWO FIVE LEFT APPROACH". In a third case, an ATC text-based message for landing clearance may include phrasing indicating that the aircraft has been cleared to land at a particular runway. For example, "RUNWAY ONE EIGHT, CLEARED TO LAND". In a fourth case, an ATC text-based message for takeoff clearance may include phrasing indicating that the aircraft has been cleared to take off from a particular runway. For example, "RUNWAY TWO SEVEN, CLEARED FOR TAKEOFF". In a fifth case, an ATC text-based message for taxi clearance may include phrasing indicating that the particular aircraft has been cleared to taxi. For example, "CLEARED HOTEL THREE TAXI".

In some embodiments, the predefined set of ATC phraseology is stored in a database (i.e., a predefined ATC phraseology database). The database may be stored, maintained, and made available for use by an electronic flight bag (EFB) application, a personal computing device, and/or a computing device or system onboard the aircraft (see FIG. 1). Here, the process 400 performs a comparison to locate a match between the text-based messages and the predefined set of ATC phraseology stored in the database.

The process 400 then identifies relevant ATC text, based on the comparison result, wherein the ATC commands comprise the ATC relevant text (step 404). Here, the process 400 locates a match between the received, text-based ATC messages and the ATC phraseology stored in the database. When a match is found, the relevant ATC text is indicated by the contents of the ATC phraseology database.

Figure 5:
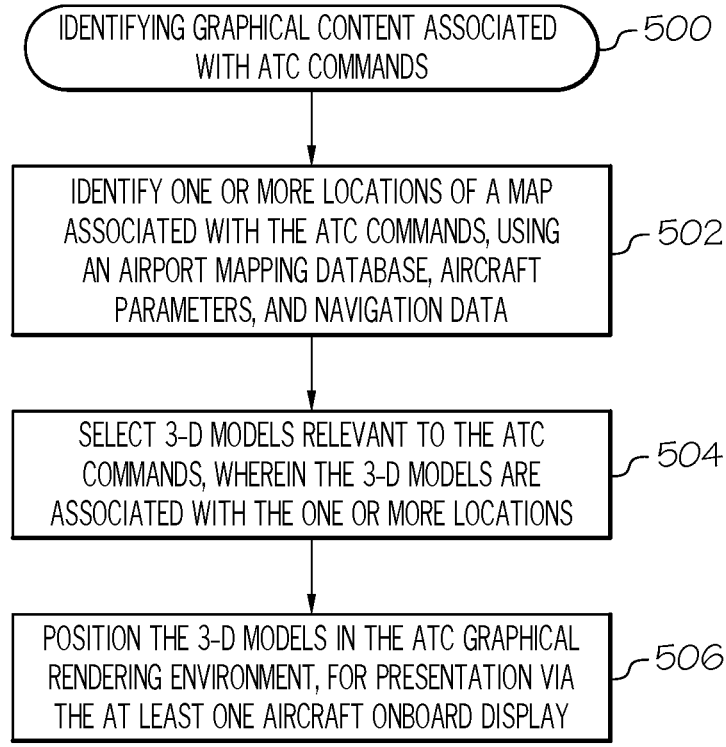
FIG. 5 is a flow chart that illustrates an embodiment of a process for identifying graphical content associated with ATC commands.

FIG. 5 is a flow chart that illustrates an embodiment of a process 500 for identifying graphical content associated with ATC commands. It should be appreciated that the process 500 described in FIG. 5 represents one embodiment of step 308 described above in the discussion of FIG. 3, including additional detail.

The process 500 identifies one or more locations of a map associated with the ATC commands, using an airport mapping database, aircraft parameters, and navigation data (step 502). The map may be an airport map and/or a geographic map accessible onboard the aircraft. The locations of the map associated with the ATC commands are selected based on the position of the aircraft. The position of the aircraft may be indicated by a global positioning system (GPS) position, an inertial reference position, or the like. The airport mapping database is hosted by an electronic flight bag (EFB) application (which is stored, maintained, and executed by a personal computing device) or any computing device onboard the aircraft. Applicable aircraft parameters may include, without limitation, pitch, roll, yaw, position, altitude, heading, track, or the like. Navigation data is used to provide navigation information for maneuvering the aircraft to a particular destination.

The process 500 then selects three-dimensional (3-D) models relevant to the ATC commands, wherein the 3-D models are associated with the one or more locations (step 504). The 3-D models are physical features of a map, which may include (i) landforms and other natural geographic features; and (ii) man-made features, such as buildings, bridges, runways, or the like. The 3-D model data can be generated by the process 500 using a navigation database and based on ATC command text. The ATC command text may be related to aerodrome surface movement, a standard instrument departure (SID) route, a standard arrival (STAR) route, approach procedures, aircraft en route procedures or the like.

After selecting the 3-D models, the process 500 positions the 3-D models in the ATC graphical rendering environment, for presentation via the at least one aircraft onboard display (step 506). Here, the process 500 associates temporality information with the three-dimensional models in the ATC graphical rendering environment, and then presents the ATC graphical rendering environment using the temporality information. The temporality information is based on the ATC commands and surface movement of the aircraft inside an airport, and may include runway closure, route portion closure, airspace information, or the like. Exemplary embodiments of 3-D models, which are associated with received ATC commands and positioned in ATC graphical rendering environment, are described with respect to FIGS. 6-7.

In certain embodiments, the process 500 applies efficient rendering techniques to the ATC graphical rendering environment, the efficient rendering techniques comprising at least bill-boarding. Bill-boarding is a technique that adjusts an orientation of an object such that the object faces some target, usually the camera. The process 500 presents the ATC graphical rendering environment using the efficient rendering techniques.

In some embodiments, the process 500 generates six degrees of freedom data for trajectory information of the three-dimensional models, which includes translation data (e.g., x-axis, y-axis, and z-axis motion data) and rotation data (e.g., roll data, pitch data, yaw data), and presents the ATC graphical rendering environment using the six degrees of freedom data.

The various tasks performed in connection with processes 300-500 may be performed by software, hardware, firmware, or any combination thereof. For illustrative purposes, the preceding description of processes 300-500 may refer to elements mentioned above in connection with FIGS. 1-2. In practice, portions of processes 300-500 may be performed by different elements of the described system. It should be appreciated that processes 300-500 may include any number of additional or alternative tasks, the tasks shown in FIGS. 3-5 need not be performed in the illustrated order, and processes 300-500 may be incorporated into a more comprehensive procedure or process having additional functionality not described in detail herein. Moreover, one or more of the tasks shown in FIGS. 3-5 could be omitted from an embodiment of the processes 300-500 as long as the intended overall functionality remains intact.

FIG. 6 is a diagram of an exemplary embodiment of an ATC graphical rendering environment 600, in accordance with the disclosed embodiments. As shown, the ATC graphical rendering environment 600 (i.e., a graphical representation of a geographic location of the aircraft 606) includes a three-dimensional (3-D) model 602 of an air traffic control (ATC) command related to an instrument landing system (ILS) approach procedure 604 for the aircraft 606. The embodiment of the ATC graphical rendering environment 600 is shown by an aircraft 606 that has received an ATC command associated with the ILS approach procedure 604 shown. Text-based ATC messages generally include instructions, commands, or approval to perform particular procedures onboard the aircraft 606. An ATC text-based message for approach clearance, for the aircraft 606, may include phrasing indicating that the aircraft 606 has been cleared to fly a specific procedure and the word "approach". For example, "CLEARED I-L-S RUNWAY TWO FIVE LEFT APPROACH". As shown, the ATC graphical rendering environment 600 presents a graphical element associated with the received ATC command, such as a 3-D model 602 of an ILS approach procedure 604, which represents a series of altitude values for use by the aircraft 606 during approach, which are presented graphically on a map. In this example, the 3-D model 602 is associated with the received ATC command and represents the series of altitude values.

FIG. 7 is a diagram of another exemplary embodiment of ATC graphical rendering environment 700, in accordance with the disclosed embodiments. As shown, the ATC graphical rendering environment 700 includes a three-dimensional (3-D) model of an air traffic control (ATC) command related to a taxi route 702 for an aircraft 706. The embodiment of the ATC graphical rendering environment 700 is displayed onboard an aircraft 706 that has received an ATC command associated with the taxi route 702 associated with a runway 704 shown. Text-based ATC messages generally include instructions, commands, or approval to perform particular procedures onboard the aircraft 706. An ATC text-based message for taxi clearance may include phrasing indicating that the particular aircraft 706 has been cleared to taxi, using the taxi route 702 for a particular runway 704. For example, "CLEARED HOTEL THREE TAXI". As shown, the ATC graphical rendering environment 700 presents a taxi route 702 of a runway 704, which is a graphical representation of the ATC command received onboard the aircraft 706 and which provides a visual reinforcement and clarification of the received ATC command for the flight crew of the aircraft 706.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing air traffic control (ATC) message data onboard an aircraft, the method comprising:
    identifying ATC commands associated with text-based messages, by at least one processor onboard the aircraft, wherein the ATC commands comprise instructions to follow one or more particular procedures associated with ATC audio messages and ATC direct text messages;
    identifying graphical content associated with the ATC commands, by the at least one processor, by:
        identifying one or more locations of a map associated with the ATC commands, using an airport mapping database, aircraft parameters, and navigation data;
        selecting three-dimensional models relevant to the ATC commands, wherein the three-dimensional models are associated with the one or more locations; and
        positioning the three-dimensional models in an ATC graphical rendering environment, for presentation via the at least one aircraft onboard display, by:
            applying efficient rendering techniques to the ATC graphical rendering environment, the efficient rendering techniques comprising at least bill-boarding;
            associating temporality information with the three-dimensional models in the ATC graphical rendering environment based on the ATC commands and surface movement of the aircraft inside an airport;
            generating six degrees of freedom data for trajectory information of the three-dimensional models; and
            presenting the ATC graphical rendering environment using the efficient rendering techniques, the temporality information, and the six degrees of freedom data;
        wherein the graphical content comprises at least the three-dimensional models positioned in the ATC graphical rendering environment and
    presenting the ATC graphical rendering environment comprising at least the graphical content, via at least one aircraft onboard display communicatively coupled to the at least one processor.

2. The method of claim 1, further comprising:
    receiving the ATC audio messages and the ATC direct text messages, by the at least one processor via a wireless communication device; and
    converting, by the at least one processor, the ATC audio messages into a plurality of text messages;
    wherein the text-based messages comprise the ATC direct text messages and the plurality of text messages.

3. The method of claim 1, wherein identifying the ATC commands associated with the text-based messages, further comprises:
    comparing the text-based messages to a predefined set of ATC phraseology, to generate a comparison result; and
    identifying ATC relevant text, based on the comparison result, wherein the ATC commands comprise the ATC relevant text.

4. The method of claim 1, further comprising:
    obtaining a video feed for presentation inside the aircraft to provide additional outside visibility, via a camera mounted on an external surface of the aircraft; and
    presenting the video feed via the at least one aircraft onboard display, wherein the ATC graphical rendering environment includes the video feed.

5. The method of claim 1, wherein the at least one aircraft onboard display comprises at least one of an electronic flight bag (EFB) display and a cockpit integrated display unit.

6. The method of claim 1, wherein the ATC graphical rendering environment comprises at least one of an augmented reality display, a virtual reality display, and an aircraft map display; and
    wherein presentation of the ATC graphical rendering environment includes presenting at least a top view and a three-dimensional view.

7. A system for providing air traffic control (ATC) message data onboard an aircraft, the system comprising:
    system memory;
    at least one communication device, configured to receive ATC audio messages and ATC direct text messages;
    at least one aircraft onboard display configured to present graphical content associated with the ATC audio messages and the ATC direct text messages; and
    at least one processor communicatively coupled to the system memory, the at least one communication device, and the at least one aircraft onboard display, the at least one processor configured to:
        identify ATC commands associated with text-based messages, wherein the ATC commands comprise instructions to follow one or more particular procedures associated with the ATC audio messages and the ATC direct text messages;
        identify graphical content associated with the ATC commands, by:
            identifying one or more locations of an airport map or a geographical map associated with the ATC commands, using an airport mapping database, aircraft parameters, and navigation data;
            selecting three-dimensional models relevant to the ATC commands, wherein the three-dimensional models are associated with the one or more locations; and
            positioning the three-dimensional models in an ATC graphical rendering environment, for presentation via the at least one aircraft onboard display, by:
                applying efficient rendering techniques to the ATC graphical rendering environment, the efficient rendering techniques comprising at least bill-boarding;
                associating temporality information with the three-dimensional models in the ATC graphical rendering environment based on the ATC commands and surface movement of the aircraft inside an airport;
                generating six degrees of freedom data for trajectory information of the three-dimensional models; and
                presenting the ATC graphical rendering environment using the efficient rendering techniques, the temporality information, and the six degrees of freedom data; and
        initiate presentation of the ATC graphical rendering environment comprising at least the graphical content, via the at least one aircraft onboard display.

8. The system of claim 7, wherein the at least one processor is further configured to:
    receive the ATC audio messages and ATC direct text messages, via the at least one communication device; and convert the ATC audio messages into a plurality of text messages;
wherein the text-based messages comprise the ATC direct text messages and the plurality of text messages.

9. The system of claim 7, wherein the at least one processor is configured to identify the ATC commands associated with received text messages, by:
comparing the text-based messages to a predefined set of ATC phraseology, to generate a comparison result; and
identifying ATC relevant text, based on the comparison result, wherein the ATC commands comprise the ATC relevant text.

10. The system of claim 7, further comprising a camera mounted on an external surface of the aircraft, communicatively coupled to the at least one processor;
wherein the at least one processor is further configured to:
obtain a video a video feed for presentation inside the aircraft to provide additional outside visibility; and
initiate presentation of the video feed and the ATC graphical rendering environment, via the at least one aircraft onboard display.

11. The system of claim 7, wherein the at least one aircraft onboard display comprises at least one of an electronic flight bag (EFB) display and a cockpit integrated display unit.

12. The system of claim 7, wherein the ATC graphical rendering environment comprises at least one of an augmented reality environment and a virtual reality environment; and
wherein presentation of the ATC graphical rendering environment includes presenting at least a top view and a three-dimensional view.

13. A non-transitory, computer-readable medium containing instructions thereon, which, when executed by a processor, perform a method comprising:
identifying graphical content associated with a set of text messages associated with air traffic control (ATC) commands received onboard an aircraft, by the processor, by:
identifying one or more locations of an airport map or a geographical map associated with the ATC commands, using an airport mapping database, aircraft parameters, and navigation data;
selecting three-dimensional models relevant to the ATC commands, wherein the three-dimensional models are associated with the one or more locations; and
positioning the three-dimensional models in the ATC graphical rendering environment, for presentation via the at least one aircraft onboard display, by:
applying efficient rendering techniques to the ATC graphical rendering environment, the efficient rendering techniques comprising at least bill-boarding;
associating temporality information with the three-dimensional models in the ATC graphical rendering environment based on the ATC commands and surface movement of the aircraft inside an airport;
generating six degrees of freedom data for trajectory information of the three-dimensional models; and
presenting the ATC graphical rendering environment using the efficient rendering techniques, the temporality information, and the six degrees of freedom data;
wherein the ATC commands comprise instructions to follow one or more particular procedures associated with ATC audio messages and ATC direct text messages; and
presenting an ATC graphical rendering environment including the graphical content, via a display device communicatively coupled to the processor, wherein the ATC graphical rendering environment comprises at least one of an augmented reality display, a virtual reality display, an aircraft map display, an en route terrain display, and an obstacle display.

14. The non-transitory, computer-readable medium of claim 13, further comprising:
receiving the ATC audio messages and the ATC direct text messages, by the processor via at least one communication device; and
converting, by the processor, the ATC audio messages into a plurality of text messages;
wherein the set of text messages comprises the ATC direct text messages and the plurality of text messages.

* * * * *